> United States Patent Office 3,652,637
Patented Mar. 28, 1972

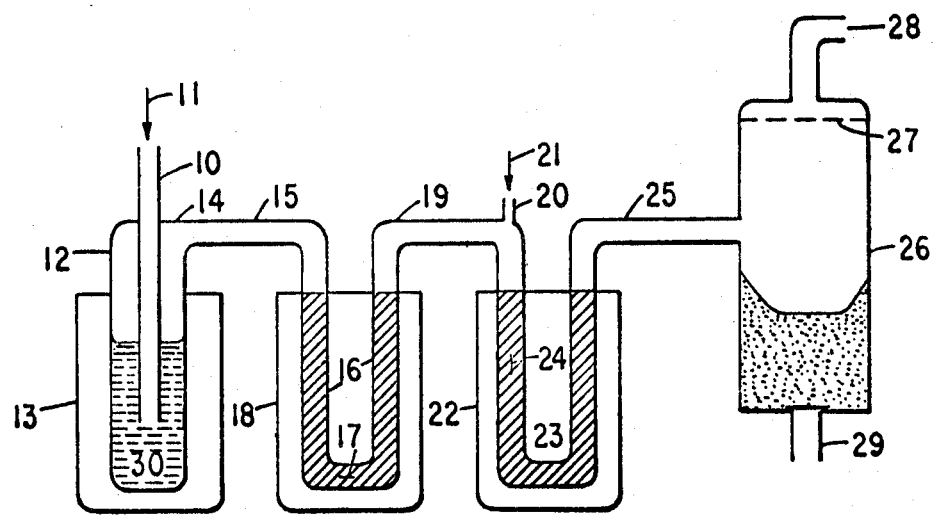

3,652,637
VAPOR PHASE SYNTHESIS OF CHLORINATED AROMATIC NITRILES
Russell M. Bimber, Painesville, Ohio, assignor to Diamond Shamrock Corporation, Cleveland, Ohio
Filed Nov. 22, 1968, Ser. No. 778,091
Int. Cl. C07c *121/02, 121/62, 121/64*
U.S. Cl. 260—465 G 7 Claims

ABSTRACT OF THE DISCLOSURE

An all-vapor phase process for the synthesis of chlorinated aromatic nitriles and chlorinated heteroaromatic nitriles involves reacting substituted aromatic and heteroaromatic compounds with ammonia and a source of oxygen under ammoxidation conditions followed by reacting the ammoxidation product while in the vapor phase with chlorine under chlorination conditions with subsequent condensation of the synthesized product to the solid state.

In general with chlorinated aromatic nitriles and chlorinated heteroaromatic nitriles, the unchlorinated nitrile intermediates used as precursors for the chlorinated end products have much greater vapor pressures than the final chlorinated product. The nitrile intermediates, therefore, tend to stay in the vapor phase so that it is difficult to recover all the nitrile intermediate produced from the gaseous effluent of the ammoxidation unit. Isolation of the nitrile intermediate is generally accomplished by cooling and filtering or centrifuging of the intermediate from the effluent of the ammoxidation unit. This is a time consuming and costly step which has made desirable a continuous reaction process for the synthesis of the chlorinated aromatic nitriles and chlorinated heteroaromatic nitriles. Recovery of the chlorinated nitriles from a hot gas stream is relatively easy because of their lower vapor pressure. A specific example of the difference in vapor pressure will be given for isophthalonitrile (IPN) (which is an intermediate for tetrachloroisophthalonitrile) and tetrachloroisophthalonitrile as follows:

|  | 100° C. | 160° C. | 280° C. | 350° C. |
|---|---|---|---|---|
| Vapor pressure of IPN (mm. Hg) | 1 | 20 | 760 |  |
| Vapor pressure of tetrachloroisophthalonitrile (mm. Hg) | 0.03 | 1.4 | 130 | 760 |

BACKGROUND OF THE INVENTION

Field of the invention

This invention relates to a vapor phase synthesis of chlorinated substituted aromatic and heteroaromatic compounds and novel chlorinated nitrile compounds and, in greater detail, encompasses the production of chlorinated nitriles from alkylated aromatic and alkylated nitrogen heteroaromatic intermediates through a continuous sequence of ammoxidizing and then chlorinating the nitrile intermediates while they are in the vapor phase.

Description of the prior art

The compounds, the syntheses of which are involved in this application, can be classified as (a) chlorinated aromatic nitriles, especially pentachlorobenzonitrile, the three isomeric tetrachlorophthalonitriles, trichlorotrimesonitrile, heptachloro-1-cyanonaphthalene, heptachloro-2-cyanonaphthalene and octachloro-4,4'-dicyanobiphenyl; and (b) chlorinated nitrogen-heteroaromatic nitriles, such as chlorinated cyanopyrazines, chlorinated cyanopyrimidines, chlorinated cyano-1,3,5-triazines, and especially the chlorinated cyanopyridines of U.S. Pat. 3,325,503, which are hereby incorporated by reference, along with tetrachloro-4-cyanopyridine.

Typical of the preparation of known chlorinated nitriles are processes involving chlorination of previously isolated nitriles. The following is offered by way of example for the polychloro derivatives of monocyano- and dicyano-pyridines. The appropriate methylated pyridine compound is reacted under ammoxidation conditions to give the appropriate cyanopyridine which is then condensed and separated from the reaction gas. Ammoxidation of picolines and other materials have been discussed by D. J. Hadley in an article entitled "The Ammoxidation Route to Nitriles" in Chemistry and Industry, Feb. 25, 1961. A subsequent step involves the chlorination of the cyanopyridine. A similar reaction sequence involving a time consuming, costly separation step is practiced to convert methylated benzenes to the chlorinated aromatic nitriles involving an ammoxidation step and isolation of the aromatic nitrile, followed by subsequent chlorination.

The ammoxidation reaction has been a relatively new process for altering intermediates to desired nitriles. The process has presented problems in obtaining economical yields which have been satisfactorily solved so that industrial processing now includes ammoxidation. However, the past history of yield problems, along with the possibility of uncontrolled reactions and accelerated corrosion, has served as a block to combining ammoxidation with chlorination reactions. This invention is a result of a determination that yields can be maintained and in some instances increased, and increased corrosive tendencies and uncontrolled reactions are not prohibitive when chlorination reactions are worked into a processing sequence with ammoxidation as the initial reaction.

SUMMARY OF THE INVENTION

This invention achieves conversion of precursors, namely substituted aromatic and substituted nitrogen-heteroaromatic compounds, through (1) an ammoxidation reaction and (2) a chlorination reaction, while maintaining the materials in the vapor state throughout the process. The products are chlorinated aromatic nitriles and chlorinated heteroaromatic nitriles.

In light of the foregoing, it is an object of this invention to react gaseous precursors in a continuous ammoxidation and chlorination sequence to achieve chlorinated aromatic nitriles and chlorinated heteroaromatic nitriles such that the sequence from intermediate to end product is conducted entirely in the vapor phase.

It is an associated object of the present invention to eliminate the isolation of any intermediates needed for synthesis of the aforementioned chlorinated aromatic nitriles and chlorinated heteroaromatic nitriles.

It is a still further object of the instant invention to combine an ammoxidation reaction with a chlorination reaction for reacting a gaseous precursor, with all of said reactions occurring in the vapor state.

Other objects and applications of the instant invention will be apparent to those skilled in the art from the following discussion, with reference to the attached drawing, the included examples, and the appended claims.

DETAILED DISCUSSION OF THE INVENTION

As can be seen from the following description of the apparatus and process, this invention achieves a departure from the prior art in that chlorination of the hot gaseous effluent from an ammoxidation reaction is practiced. In greater detail, this invention represents a process whereby the appropriate alkyl aromatic or alkyl nitrogen-heteroaromatic compound is reacted with ammonia and oxygen in a process referred to in the art as "ammoxidation," followed by a chlorination of the hot gaseous effluent from the ammoxidation reaction, thus achieving the synthesis of chlorinated aromatic nitriles or chlorinated heteroaromatic nitriles without isolation of the intermediate nitriles. As can be seen from the foregoing discussion of the prior art, this process represents a remarkable improvement in efficiency, thus lowering costs of the resulting synthesized materials, because it eliminates the need to recover any intermediate products.

The figure represents one embodiment of the apparatus which may be employed in the practice of the process of this invention. The figure shows an inlet pipe 10 having a liquid alkyl-substituted compound, gaseous ammonia and an oxygen-containing gas, preferably air, all as represented by arrow 11 being metered into a vaporizer 12 so that they pass through the liquid alkyl-substituted compound 30 in vaporizer 12. The liquid alkyl-substituted compound in the vaporizer 12 is maintained at a high level while the temperature of the vaporizer is regulated by heater 13 to obtain the desired molar proportion of alkyl compound in the gas stream flowing out the exit 14, through pipe 15, heated to prevent condensation, into the ammoxidation unit 16. The ammoxidation unit 16 consists of a U-shaped length of pipe 16 containing a suitable ammoxidation catalyst 17, such as vanadia on alumina having a specific surface of 10 square meters, or less, per gram of catalyst. Catalysts suitable for the conversion of o-xylene to phthalic anhydride are generally suitable for the ammoxidation process. The temperature of the ammoxidation unit is controlled by heater 18 to achieve the desired ammoxidation of the alkyl-substituted compound to produce the desired aromatic or heteroaromatic compound. The temperature control within the ammoxidation unit 16 is achieved by immersing it in a heating bath 18 maintained at 300°–550° C., preferably near 430° C. The gaseous mixture flowing out of the ammoxidation unit at 19 is sufficiently heated to prevent condensation. It is mixed with a chlorine-containing gas stream (arrow 21) which is metered in through input pipe 20. The chlorine-containing gas then travels through the chlorinator 23 where the desired chlorinated compounds are formed. The chlorinator consists of a U-shaped pipe 23 containing a suitable catalyst 24 such as granular carbon or a high specific surface (>100 m.²/g.) alumina or silica, heated at 250°–500° C., preferably 300° C. by bath 22. The chlorine-containing gas and the chlorinated ammoxidized product then travel through a line 25, heated to prevent condensation, into a large sublimation chamber 26, where cooling causes the product to condense to a solid. The remainder of the gas stream passes through a filter 27 into a line 28 which leads to a pollution control unit (not shown). The pollution control unit may incorporate systems to recover one or more of the gases of ammonia, chlorine, and unchlorinated and chlorinated nitriles, or may just involve scrubbing the gas with water and neutralizing the water with caustic. The solid product which accumulates in the bottom of the sublimation chamber 26 is periodically removed through a closable outlet 29.

In the ammoxidation reaction, the preferred proportions of reactants depend upon the number and type of alkyl groups in each molecule being converted to cyano groups. In general, preefrred practice involves the use of two to ten times the theoretical amounts of ammonia and oxygen required to balance a chemical equation of the reaction. Additional diluent gas, such as steam, air, or nitrogen, is sometimes employed as an aid in controlling temperature and/or avoiding any potential undesired build-up of the alkyl-substituted compound. The especially preferred proportions of reactants involves about four times the theoretical amounts of ammonia and air, i.e., 1:8:60 molar proportions of a dimethyl-substituted compound: ammonia:air.

In the chlorination, about 20% excess chlorine is generally employed to insure complete chlorination. Depending upon temperature, type of catalyst, the duration of contact of the gaseous reactant stream with the chlorination catalyst, etc., more or less chlorine may be required.

From the foregoing discussion it will be realized that a wide range of temperature and pressure can be practiced for the ammoxidation step in the foregoing synthesis. Namely, the ammoxidation step may be conducted within the range of atmospheric pressure to 50 pounds per square inch gauge, and at a temperature range of 300°–550° C. An especially preferred temperature range is 400°–500° C. when operating near atmospheric pressure. This range produces a high yield of the desired product. Catalysts, such as vanadium pentoxide on alumina, are employed in the ammoxidation reaction. Catalysts suitable for the vapor phase oxidation of o-xylene to phthalic anhydride are generally suitable for these ammoxidations.

Also, it will be apparent that the chlorination step can be conducted using a wide range of pressures, temperatures and catalysts. In particular, it is envisioned that the chlorination step can be conducted from atmospheric pressure up to 50 pounds per square inch gauge and a temperature range of 250°–500° C. An especially preferred pressure and temperature range is 300°–350° C. at about atmospheric pressure which range enables maintaining a vapor phase during the reaction with a minimum of by-products. Catalysts which can be employed in the chlorination step include the classes of aluminates, silicates and carbonaceous materials with preferred catalysts being carbon, alumina and silica having a high specific surface (i.e., >100 square meters per gram).

Suitable reactants for the ammoxidation-chlorination sequence include toluene, xylenes, and polyalkyl benzenes as a class of reactants when a chlorinated aromatic nitrile is to be synthesized and an alkyl-substituted derivative of pyridine, pyrimidine, pyrazine or 1,3,5-triazine as a class of reactants when a heteroaromatic nitrile is to be synthesized. Typical of the aromatic hydrocarbons which are capable of serving as precursors in the practice of this invention are:

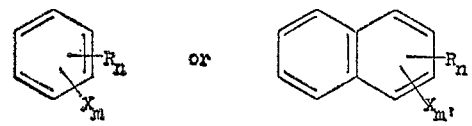

where R may be like or unlike alkyl radicals or alkaryl radicals, with $n$ being an integer from 1 to 5; X is halogen; $m$ is an integer of 0 to 4; $m'$ is an integer of 0 to 6, and any unspecified substituents being hydrogen, with the compounds having at least one aromatic hydrogen. Typical compounds are toluene, the three isomeric xylenes, mesitylene, 1- and 2-methylnaphthalenes, 4,4'-ditolyl, and their halogenated, alkylated and alkarylated derivatives. Alkyl substituents other than methyl may be employed but have a practical limitation of cost.

Typical heteroaromatic compounds which may be used as precursors in the practice of the instant invention include those of the general formula

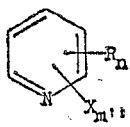

wherein R and X have the same meaning stated above; $n$ being an integer of 1 to 4; $m'''$ being an integer of 0 to 3, and any unspecified substituents being hydrogen, with the compounds having at least one aromatic hydrogen. Typical pyridines falling within the above formula include the methylated pyridines such as the picolines, lutidines, and 2,4,6-collidines and their halogenated, alkylated and alkarylated derivatives. Alkyl substituents other than methyl may be employed but have a practical limitation of cost.

Another heteroaromatic class of compounds which may be used as precursors in the practice of the instant invention include those of the general formulas

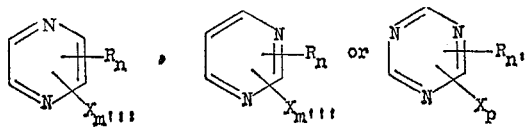

wherein R and X have the same meaning stated above; $n$ being an integer of 1 to 3; $m'''$ being an integer of 0 to 2; $p$ being an integer of 0 to 2; $n'$ being an integer of 1 to 2, and any unspecified substituents being hydrogen, with the compounds having at least one aromatic hydrogen.

The novel compounds resulting as products from the practice of this invention are (a) 1,3,4,5,6,7,8-heptachloro-2-naphthonitrile

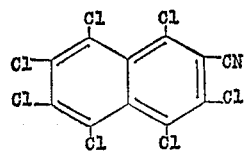

which can be prepared by chlorinating 2-naphthonitrile, the 2-naphthonitrile in turn being prepared by ammoxidizing 2-methyl naphthalene.

(b) 2,3,4,5,6,7,8-heptachloro-1-naphthonitrile

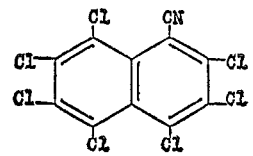

which can be prepared by chlorinating 1-naphthonitrile, the 1-naphthonitrile in turn being prepared by ammoxidizing 1-methyl naphthalene.

(c) octachloro-4,4'-biphenyldicarbonitrile

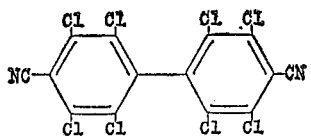

which can be prepared by chlorinating 4,4'-biphenyldicarbonitrile which in turn is prepared by ammoxidizing 4,4'-bitolyl.

(d) 3,5,6-trichloro-2-cyanopyrazine

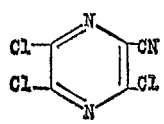

which can be prepared by chlorinating 2-cyanopyrazine, the 2-cyanopyrazine in turn being prepared by ammoxidizing 2-methyl pyrazine.

A greater discussion of the reactions and their resulting products will be presented later in Examples 1 and 2 and Table 1.

Referring again to the figure, the upstream end of the flow reaction system can be classified as a conversion by way of ammoxidation (items numbered 10–19) to nitriles, but the nitrile is then chlorinated without isolation while still in the vapor phase. It is this chlorination in the vapor phase which represents a great increase in efficiency from past processes of synthesizing chlorinating aromatic nitriles and chlorinated heteroaromatic nitriles. The chlorination of the gaseous ammoxidation product may be accomplished by the addition of chlorine and maintaining the mixture of chlorine and gaseous ammoxidation product in the presence of a suitable catalyst at a suitable temperature long enough for the desired chlorination to occur. Catalysts which can be employed for this chlorination include carbon and alumina-silica materials with a specific surface greater than 100 m.$^2$/g. Optionally, up to about 30% of one or more metal chlorides may be incorporated in the catalyst. The preferred metal chlorides are those of copper, barium, and the rare earths. The catalysts may be used either in fixed beds or in fluidized beds. Sufficient time for reaction must be allowed which means sufficient catalyst volume must be allowed, and the nitrile-containing vapor must be held at the reaction temperature for a minimum time ranging from a few seconds to about two minutes. When the desired product contains no remaining hydrogen and the temperature of the chlorination is not too high, long reaction times generally do not reduce the yields obtained.

The chlorinated nitrile products are isolated from the gas stream by cooling. It is usually desirable to wash the product with water to remove ammonium chloride. The products may be further purified by distillation or by recrystallization as desired. The products are often more than 95% pure after the water wash, so no further purification is necessary for normal industrial applications. The products from this process are crystalline solids at room temperature.

In order that those skilled in the art may more completely understand the present invention and the preferred methods by which the same may be carried into effect, the following specific examples are offered.

EXAMPLE 1

Conversion of m-xylene to tetrachloroisophthalonitrile

Tetrachloroisophthalonitrile was prepared in the following manner. Metered flows of air at 0.04 mole per minute and ammonia at 0.0064 mole per minute were combined and bubbled through m-xylene at 24° C., producing a feed gas stream containing about 1:9:56 molar proportions of m-xylene:ammonia:air. The resulting mixture was fed through 190 ml. of Harshaw's vanadia catalyst V1002E $\cdot$/16 (6% V$_2$O$_5$ and 3% MoO$_3$ on alumina, 1 m.$^2$/g.) in a ⅞-inch O.D. nickel U-tube (number 16 in the figure) immersed in a 460° C. heating bath. The gas leaving the vanadia catalyst was kept hot to prevent sublimation while chlorine was added and the mixture was fed into a chlorinator (number 23 in the figure). The chlorinator consisted of a ⅞-inch O.D. nickel tube containing 190 ml. of Harshaw's Ba–0108E–4–6 catalyst (27% barium chloride on carbon), heated by immersion in a heating bath held at 330° C. The chlorine flow of roughly 0.005 mole per minute was sufficient to maintain a yellow-green color indicative of excess chlorine in the gas leaving the chlorinator. The exit gas was cooled to sublime the solid product, filtered to remove entrained solids, and the gaseous by-products were disposed of in a caustic solution scrubber. The system was operated for an hour and fifteen minutes. The sublimed product was dissolved in chloroform, combined with a chloroform extract of the chlorination catalyst, and evaporated to dryness. Recrystallizing the solid residue from carbon tetrachloride with a decolorizing carbon treatment produced a pure colorless solid. The melting points of this product, of previously prepared pure tetrachloroisophthalonitrile, and of a mixture of the two, observed simultaneously, were identical (ca. 250° C.) thus confirming the identity of the product as the desired tetrachloroisophthalonitrile. From my experimentation to date, one may expect about 16% more tetrachloroisophthalonitrile from any given amount of m-xylene by my process versus the current method of making tetrachloroisophthalonitrile. The production of tetrachloroisophthalonitrile is currently done in two steps. The first involves ammoxidation of m-xylene and recovering solid isophthalonitrile from the hot gaseous reaction products. The second step involves vaporizing the isophthalonitrile into a vapor phase chlorinator with chlorination and recovering the product from a hot gas stream.

Tetrachloroisophthalonitrile is an effective pesticide as disclosed in U.S. Pats. Nos. 3,290,353 and 3,331,735.

EXAMPLE 2

Conversion of 3-methylpyridine to tetrachloro-3-cyanopyridine

The conversion of 3-methylpyridine to tetrachloro-3-cyanopyridine was achieved via ammoxidation-chlorination in an all-vapor phase process. A mixture of 3-methylpyridine vapor, ammonia, and air in roughly 1:8:58 molar proportions was fed at a total rate of about 0.046 mole per minute through 400 g. of Harshaw's vanadia catalyst V1002E ³⁄₁₆ (as described in Example 1) in a ⅞-inch nickel tube immersed in a heating bath maintained at 430°±5° C. The gas stream leaving the vanadia catalyst was combined with chlorine, at a chlorine flow rate of about 0.003 mole per minute and fed through 190 ml. of a granular carbon catalyst in a ⅞-inch nickel tube immersed in a bath maintained at 290° to 325° C.

The product stream leaving the catalyst was cooled to condense the solid product and filtered through glass wool to collect suspended solids before the by-product gas was vented to a scrubber. After 2 hours and 10 minutes of operation, the carbon catalyst, condenser, and filter were rinsed with warm chloroform. Filtering and evaporating the chloroform left 1.6 g. of crude product melting at 133° to 140° C. Recrystallizing from about 25 ml. of carbon tetrachloride with a charcoal treatment produced almost pure tetrachloro-3-cyanopyridine melting at 148.5° to 149.5° C. A mixed melting point with tetrachloro-3-cyanopyridine (prepared by the method of U.S. Pat. No. 3,325,503) was not depressed, thus confirming the identity of the product of this example.

EXAMPLES 3–14

Following the procedures outlined in Example 1, a series of reactants and catalysts were subjected to an ammoxidation reaction and then a chlorination reaction while still in the vapor phase as presented in the following Table 1. The table includes a list of the reactants, the molar ratio of the reactants, identification of the resulting product and the melting point of the product.

This table lists additional chlorinated nitriles which may be prepared by an ammoxidation-chlorination sequence similar to that of Examples 1 and 2. All experiments were done under the slight pressure required to obtain the desired flow rates with the effluent being fed through a filter into the atmosphere. The temperatures of the baths surrounding the ammoxidation unit and the chlorination unit were 400° to 460° C. and 300° to 350° C., respectively, and varied from the starting temperature by up to 30° C. during individual preparations, during runs for up to four hours. The chlorine feed rates were adjusted as required to maintain a chlorine color in the gas leaving the system. The ammoxidation catalyst was the same as in Examples 1 and 2. The chlorination catalysts included Harshaw's Ba–0108E4–6, granular cocoanut charcoal, and granular petroleum coke. The precursor compounds used, approximate mole ratios of precursor:ammonia:air fed into the ammoxidation unit, and the major product from the chlorination unit, together with its melting point are given in Table 1. The elemental analysis of those compounds which are novel is also given. Infrared spectra of all products gave additional proof of their identity.

TABLE 1

| Example | Precursor compound | Mole ratios (precursor: ammonia: air) | Product | Melting point of product (° C.) | Analysis (percent) (for novel compounds only) | |
|---|---|---|---|---|---|---|
| | | | | | Calculated (Cl) | Found (Cl) |
| 3 | Toluene | 1:6:65 | Pentachlorobenzonitrile | 213–5 | | |
| 4 | o-Xylene | 1:10:60 | Tetrachlorophthalonitrile | 247–9 | | |
| 5 | p-Xylene | 1:8:58 | Tetrachloroterephthalonitrile | 303–5 | | |
| 6 | Mesitylene | 1:12:85 | Trichlorotrimesonitrile | 327–8 | | |
| 7 | 4,4'-ditolyl | 1:8:60 | Octachloro-4,4'-dicyanobiphenyl | 321.5–3.0 | 59.1 | 59.0 |
| 8 | 1-methylnaphthalene | 1:6:65 | Heptachloro-1-naphthanitrile | 155.5–6.5 | 62.9 | 62.7 |
| 9 | 2-methylnaphthalene | 1:6:65 | Heptachloro-2-naphthanitrile | 196.5–8.0 | 62.9 | 63.1 |
| 10 | 2-methylpyridine | 1:8:60 | Tetrachloro-2-cyanopyridine | 149–50 | | |
| 11 | 4-methylpyridine | 1:8:60 | Tetrachloro-4-cyanopyridine | 138.5–9.5 | | |
| 12 | 2,4-lutidine | 1:8:58 | Trichloro-2,4-dicyanopyridine | 117–118 | | |
| 13 | 2,6-lutidine | 1:8:58 | Trichloro-2,6-dicyanopyridine | 200–1 | | |
| 14 | 2-methylpyrazine | 1:8:60 | 3,5,6-trichloro-2-cyanopyrazine | 101.5–3.0 | ¹51.0 | ¹50.6 |

¹ C: calcd. 28.8, found 29.3; H: calcd. 0, found 0.23; N: calcd. 20.2, found 20.3.

Examples 15 through 19 are tests conducted on the novel compounds of this invention.

EXAMPLE 15

Foliage protectant and eradicant test

The tomato foliage disease test measures the ability of the test compound to protect tomato foliage against infection by early blight fungus *Alternaria solani* (Ell. and Mart.). The method used employs tomato plants, 5 to 7 inches high which are 4 to 6 weeks old. Duplicate plants are sprayed with various dosages of the test formulation at 40 lbs./sq. in. air pressure while being rotated on a turntable in a hood. The center of the turntable is 45 inches from the nozzle of the spray gun. The test formulation containing the test compound, acetone, stock emulsifier solution and distilled water is applied at concentrations up to 2000 p.p.m. of the test chemical. Lower concentrations of toxicant are obtained by employing less toxicant and more water, thereby maintaining the same concentration of acetone and emulsifier.

After the spray deposit is dry, treated plants and controls (sprayed with formulation less toxicant) are sprayed while being rotated on a turntable with a spore suspension containing approximately 20,000 conidia of *A. solani* per ml. The atomizer used delivers 20 ml. in the 30-second exposure period. The plans are held in a saturated atmosphere for 24 hours at 70° F. to permit spore germination and infection before removal to the greenhouse.

After two days from the start of the test for early blight, lesion counts are made on the three uppermost fully expanded leaves. The data are converted to percent disease control based on the number of lesions obtained on the control plants. Dosages and percent disease control are given in the following table:

Compound, 1,3,4,5,6,7,8-heptachloro-2-naphthonitrile

Dosage (p.p.m.) _____ 1000
Percent disease control _____ 90

EXAMPLE 16

Housefly immersion test

This test determines the insecticidal activity of the compound being tested against houseflies, *Musca domestica*.

The formulation for this test contains 0.1 g. of test compound, 4.0 ml. acetone, 2.0 ml. stock emulsifier solution (0.5% Triton X-155 in water by volume) and 94.0 ml. of a ten-percent sugar solution. The concentration of toxicant in this formulation is up to 1000 p.p.m., with lower concentrations being obtained by diluting the formulation with distilled water. The chemical is formulated in a 125-ml. Erlenmeyer flask, adult houseflies (male and female), anesthetized with carbon dioxide, being placed therein and the flask is swirled, wetting the flies with the formulation. The contents of the flask are quickly poured onto a copper wire screen which retains the flies, but permits the formulation to pass through to a beaker where it is available for further testing. The flies are drained a few seconds and then transferred to a 5-oz. Dixie cup containing a disc of 7 cm. Whatman No. 1 filter paper; the cup is immediately covered with a Petri dish lid. The filter paper used is pretreated by soaking it in a 10-percent sucrose solution and drying it and thereby it serves two purposes in the Dixie cup, a source of needed nutrition and absorption of excess formulation from the bodies of the flies. Mortality is determined one day after treatment. Results of insecticidal activity are given in the following table:

Compound tested, octachloro-4,4'-biphenyldicarbonitrile

Concentration p.p.m. _____ 1000
Percent mortality _____ 10

EXAMPLE 17

Soil fungicide test

The following test measures the ability of the test compounds to protect peas (*Pisum sativum* L. var. Perfection) from damping-off by *Fusarium solani f. pisi*. Infestation of the soil is accomplished with cornmeal-sand-water (7:6:5) cultures. Each screened culture is separately mixed with ca. 1000 g. screened, autoclaved soil in plastic bags. Each resulting mixture is then used to infest one flat of screened autoclaved soil by thorough incorporation. Grams of cornmeal-sand-water culture are used at the following value per flat of soil: *F. solani f. pisi*—400 g.

The separation of cultures is maintained, but infested soil from the flats is transferred to four-inch vacuum-form plastic pots. After 25 pea seeds have been placed at a one-half inch depth in each pot, a soil drench is carried out with 25 ml. of the test formulation per pot, which is equivalent to a concentration of active chemical of 48 pounds per acre. This test formulation contains 0.15 g. (or 0.15 ml. if a liquid) of the test chemical, 4.0 ml. acetone, 2.0 ml. stock emulsifier solution (0.5% Triton X-155 in water by volume), and 94.0 ml. distilled water.

Emergence data are obtained for the host pathogen system seven to ten days after planting, inoculation and treatment. The *F. solani* vs. pea system is evaluated for a qualitative damage rating, after 30 days of exposure, as described by the following formula:

$$\text{Damage Rating} = \frac{(X_1)(N_1) + (X_2)(N_2) + (X_3)(N_3)}{(n)(k)} \times 100$$

$X_1$=severe damage class or necrosis, value=1
$X_2$=moderate damage class value=2
$X_3$=no visible damage class value=3
$N_{1...2...3}$=number of representatives per damage class
$n$=number of seeds per treatment
$k$=3

Low summary values indicate high damage and poor control, high summary values (maximum 100) indicate low damage and good control. Using this procedure, the following results are obtained:

| Compound tested | Dosage, lbs./acre | Percent disease control of *F. solani* |
|---|---|---|
| Octachloro-4,4'-biphenyldicarbonitrile | 48 | 32 |
| 2,3,4,5,6,7,8-heptachloro-1-naphthonitrile | 48 | 4 |

EXAMPLE 18

Viricide test

Test formulations are examined for ability to control the host virus system of maize dwarf mosaic virus on Golden Bantam sweet corn. A test formulation containing 0.1 g. of the test chemical (or 0.1 ml. if a liquid), 4.0 ml. acetone, 2.0 ml. stock emulsifier solution (0.5% Triton X-155 in water by volume), and 94.0 ml. distilled water is prepared for both the soil drench and foliage spray treatments. The host virus system, maize dwarf mosaic cirus on *Zea mays* var. Golden X Bantam, is cultured in a four-inch clay pot. Virus inoculation is made by carborundum leaf abrasion method prior to treatment.

In the foliage spray application, 33 ml. of the test formulation (250 p.p.m.) are sprayed at 40 pounds per square inch air pressure while the plants are being rotated on a turntable in a hood. Twenty-four hours after spraying, in the soil drench treatment, the test formulation is applied at the soil surface of each pot; 45 ml. of the formulation being equivalent to a dosage of the test chemical of 64 pounds per acre. Effective control is determined through visual observation of the presence or absence of viral infection symptoms ten days after inoculation. Using this procedure, the following results are obtained:

| Compound | Dosage | | Percent control | |
|---|---|---|---|---|
| | lbs./acre | P.p.m. | Soil drench (corn) | Foliage spray (corn) |
| 3,5,6-trichloro-2-cyanopyrazine | 16 | 250 | 100 | 100 |

EXAMPLE 19

Post-emergence tests on soil for broadleaf and grass species

This test measures the post-emergence herbicidal activity of test chemicals applied to the foliage of seeding plants, as well as to the soil in which they are growing. Seeds of six species are planted in soil contained in 9 x 9 x 2-inch aluminum cake pans filled to within ½-inch of the top with composted greenhouse soil. The seeds planted consist of three broadleaf species (buckwheat, *Fagopyrum esculentum*, turnip, *Brassica rapa*, and zinnia, *Zinnia* spp.) and three grass species (sorghum, *Sorghum vulgare*, Italian millet, *Panicum ramosum*, and perennial ryegrass, *Lolium perenne*). The soil in each pan is divided into two equal rectangular areas, and the broadleaves are seeded into one-half of one of these areas and the grasses into the other half of the same area. The seeds are then covered uniformly with about one-fourth inch of soil and watered, after which they are removed to the greenhouse and the test species are allowed to grow until one true leaf is present on the slowest growing broadleaf (zinnia). This requires between 7 and 14 days depending upon the time of the year.

The pans are then sprayed at 10 p.s.i., uniformly covering the surface of the soil and the foliage with 40 ml. of test formulation (520 p.p.m.) at a dosage of 4 pounds per acre. This formulation contains 0.021 g. chemical (0.02 ml. of a liquid), 5.0 ml. acetone, 0.5 ml. stock emulsifier solution (0.5% Triton X-155 in water by volume), and distilled water to make 40 ml.

Two weeks after treatment, percent control is estimated and information on phytotoxicity, growth regulation, and other effects are recorded. Using this procedure, the following results are obtained:

| Compound | Dosage (lbs./A) | Percent control and other effects post emergence | |
|---|---|---|---|
| | | Broadleaves | Grasses |
| 3,5,6-trichloro-2-cyanopyrazine | 4 | [1] 65 | [2] 35 |

[1] No turnips.
[2] No millet.

What is claimed is:
1. A method of synthesizing a chlorinated aromatic nitrile comprising the steps of:
   (a) reacting in the vapor phase in the presence of ammonia and air at a temperature of 300° to 550° C. and a pressure from atmospheric to 50 pounds per square inch gauge in the presence of an ammoxidation catalyst to obtain an ammoxidation product, a precursor of the formula

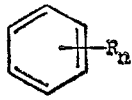

where R is a methyl radical, and $n$ is an integer of 1 to 3 with the proviso that from 2 to 10 times the theoretical amounts of ammonia and oxygen required for the ammoxidation reaction are present, and thereafter
   (b) reacting in the vapor phase, the product of step (a) with excess chlorine at a temperature of 250° to 500° C. and a pressure from atmospheric to 50 pounds per square inch gauge in the presence of a carbon catalyst to obtain the chlorinated aromatic nitrile.

2. The method of claim 1 wherein the precursor is toluene.
3. The method of claim 1 wherein the ammoxidation catalyst is a vanadia catalyst.
4. The method of claim 1 wherein the precursor is xylene.
5. The method of claim 4 wherein the chlorinated aromatic nitrile is tetrachloroisophthalonitrile.
6. The method of claim 1 wherein the precursor is trimethylbenzene.
7. The method of claim 6 wherein the chlorinated aromatic nitrile is trichlorotrimesonitrile.

References Cited
UNITED STATES PATENTS

| | | | |
|---|---|---|---|
| 2,499,055 | 2/1950 | Cosby et al. | 260—465 |
| 3,108,130 | 10/1963 | Haga et al. | 260—465 |
| 3,399,225 | 8/1968 | Tarama et al. | 260—465 |
| 3,497,547 | 2/1970 | Scheuermann et al. | 260—465 |

FOREIGN PATENTS 947,167  1/1964  Great Britain.

CHARLES B. PARKER, Primary Examiner

D. H. TORRENCE, Assistant Examiner

U.S. Cl. X.R.

71—92; 260—248 R, 250 R, 251 R, 294.9, 465 C; 424—250, 304